United States Patent [19]
Lansard

[11] Patent Number: 5,927,652
[45] Date of Patent: Jul. 27, 1999

[54] SYSTEM FOR OBSERVATION OF GEOSTATIONARY SATELLITES, USE OF A SYSTEM OF THIS KIND AND CORRESPONDING OBSERVATION METHODS

[75] Inventor: Erick Lansard, Ramonville St Agne, France

[73] Assignee: Alcatel Espace, Nanterre Cedex, France

[21] Appl. No.: 08/686,403

[22] Filed: Jul. 25, 1996

[30] Foreign Application Priority Data

Jul. 26, 1995 [FR] France .................................. 95 09 088

[51] Int. Cl.⁶ .................................................. B64G 1/10
[52] U.S. Cl. .......................................................... 244/158 R
[58] Field of Search ........................................ 244/158 R

[56] References Cited

U.S. PATENT DOCUMENTS 3,491,591  1/1970  Grosch et al. .
4,375,697  3/1983  Visher ................................. 244/158 R
5,460,341  10/1995  Katsuyama et al. ................ 244/158 R

FOREIGN PATENT DOCUMENTS

WO8907549  8/1989  WIPO .
WO9213312  8/1992  WIPO .

Primary Examiner—Galen L. Barefoot
Attorney, Agent, or Firm—Sughrue, Mion, Zinn, Macpeak & Seas, PLLC

[57] ABSTRACT

The invention concerns, in particular, a system of observation of geostationary satellites ($10_1$–$10_n$). In accordance with the invention, this system comprises at least one observation satellite (15) in an observation orbit (16, 17) near the geostationary orbit (11), this observation satellite (15) having an apparatus for observation of the geostationary satellites ($10_1$–$10_n$) and an apparatus for transmission of the information obtained from the observation apparatus (20, 21, 22) to a receiver. The invention applies, in particular, to the discrimination of communication, meteorological, early warning and electromagnetic monitoring satellites.

10 Claims, 1 Drawing Sheet

SYSTEM FOR OBSERVATION OF GEOSTATIONARY SATELLITES, USE OF A SYSTEM OF THIS KIND AND CORRESPONDING OBSERVATION METHODS

BACKGROUND OF THE INVENTION

The field of the invention is that of the observation of geostationary satellites and is more particularly concerned with a system for observation of geostationary satellites, use of a system of this kind and corresponding observation methods.

By definition, a geostationary satellite is a satellite that has been placed in geostationary orbit, for example by a launch vehicle such as Ariane (France) or a space shuttle such as Discovery (USA). From any geographical location of the surface of the Earth, a geostationary satellite is always seen at the same azimuth and elevation coordinates. The geostationary orbit is the curved path followed in space by geostationary satellites. It is a quasi-circular orbit approximately 36 000 km from the Earth.

Geostationary satellites can have a civilian role (telephone communications, television transmission, meteorology, etc) or a military role (encrypted communications, detection and location of electromagnetic emissions, launching of missiles, etc) and this is why it is of benefit to be able to monitor the nature of their roles. For example, it is important to be able to detect whether a supposedly civilian satellite in fact has a military role. In particular, it is desirable to be able to distinguish between communication, meteorological, early warning and electromagnetic monitoring satellites.

Existing observation systems use imaging devices installed in ground stations. These imaging devices may use adaptive optic telescopes, for example. However, their main drawback is that the quality of the image they provide depends on the illumination conditions: they cannot be used in cloudy weather or in the presence of atmospheric turbulence. Moreover, the best optical and radar imaging systems operating from ground stations offer in fine weather decimetric resolutions at 300 km, i.e. decametric resolutions beyond 40 000 km; it follows that a satellite in geostationary orbit occupies only one pixel of an image. In this case, it is just possible to detect the presence of an intruder satellite in the geostationary orbit but it is impossible to determine the role of a geostationary satellite.

Furthermore, these telescopes are very costly and of not inconsiderable size.

Finally, for the meteorological reasons previously mentioned, these telescopes are located on exposed sites, for example on mountain tops, and therefore constitute vulnerable targets.

OBJECTS AND SUMMARY OF THE INVENTION

One objective of the present invention is to alleviate these drawbacks.

To be more precise, one objective of the invention is to provide a system for observation of geostationary satellites providing images with a definition enabling the role of different satellites to be determined.

This objective, and others that emerge below, is achieved by a system for observation of geostationary satellites in the geostationary orbit, the system comprising at least one observation satellite in an observation orbit near the geostationary orbit, said observation satellite comprising means for observation of said geostationary satellites and means for transmitting information obtained from said observation means to a receiver.

The observation satellite of the invention advantageously comprises a propulsion system enabling it to move relative to the geostationary orbit.

The observation means on board the observation satellite preferably comprise an optical telescope, and possibly an infrared video camera and/or means for monitoring radio transmissions from the geostationary satellite.

The observation satellite advantageously comprises means for storing information obtained from the observation means.

The invention also concerns the use of a system of this kind for the observation of geostationary satellites.

The invention also concerns a method of observation of geostationary satellites in the geostationary orbit, the method consisting in:

placing at least one observation satellite in an observation orbit near the geostationary orbit;

observing the geostationary satellites; and transmitting the information obtained from such observations to a receiver.

The observation orbit is advantageously at a nominal distance of approximately 100 km from the geostationary orbit.

The method of the invention can also consist in displacing the observation satellite on both sides of the geostationary orbit in order to limit the observation to a sector of the geostationary orbit.

The invention also concerns another method of observation of geostationary satellites in the geostationary orbit, this other method consisting in:

providing observation means on a host satellite designed to be placed in the geostationary orbit;

observing the geostationary satellites during injection of the host satellite into the geostationary orbit; and transmitting the information obtained from such observations to a receiver.

BRIEF DESCRIPTION OF THE DRAWINGS

Other features and advantages of the invention will emerge from the reading of the following description of a preferred embodiment, which is given by way of non-limiting illustrative example, and from the appended drawings in which.

DETAILED DESCRIPTION OF THE INVENTION

Figure 1:
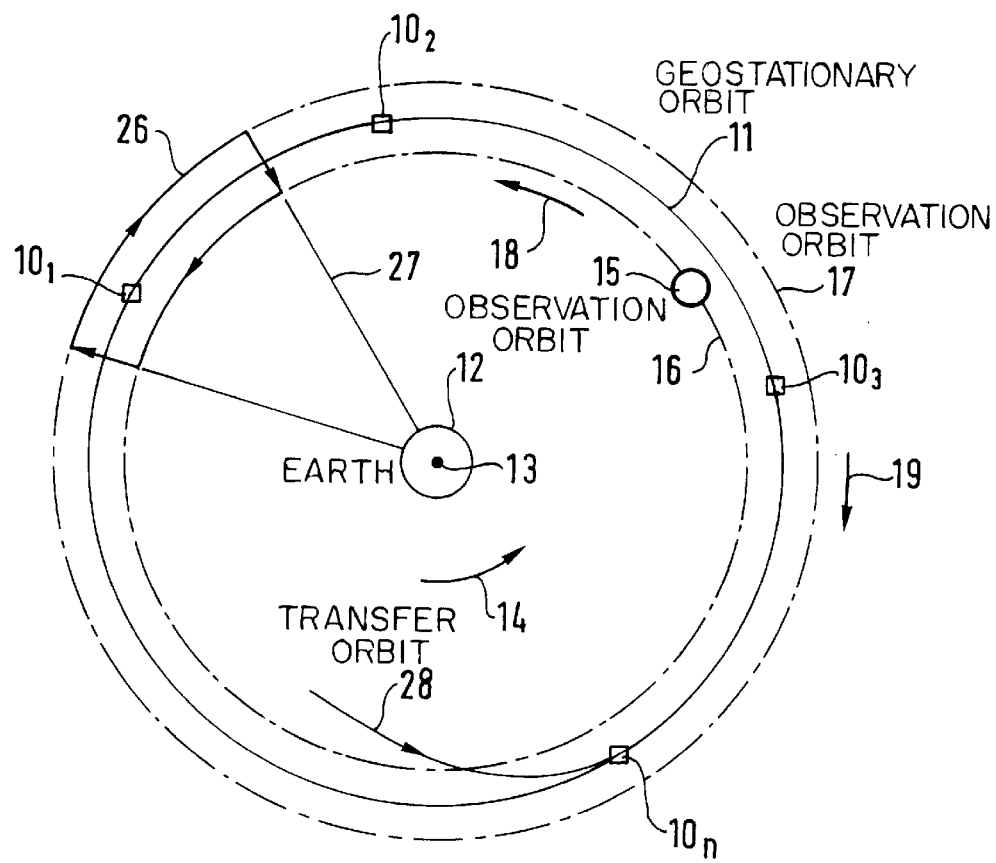
FIG. 1 is diagrammatic view of a constellation of geostationary satellites.

FIG. 1 is a diagrammatic view of a constellation of geostationary satellites. For simplicity the diagram is not to scale. The geostationary satellites are represented by squares labeled $10_1$ through $10_n$. The geostationary orbit 11 is shown as circular for simplicity. The figure shows the Earth 12 and the North pole 13 and the arrow 14 shows the direction of the rotation of the Earth. The angular velocity of the geostationary satellites $10_i$ is equal to that of the Earth 12 and they are at the zenith of the equator.

The system of the invention for observation of geostationary satellites $10_1$ through $10_n$ comprises at least one observation satellite labelled 15 in FIG. 1. This observation satellite is represented by a circle and is on an observation orbit 16 or 17 near the geostationary orbit 11. The observation satellite 15 carries means for observation of the geostationary satellites $10_1$ through $10_n$ and means for transmitting information obtained from these observation means to a receiver.

The observation orbits 16 and 17 are quasi-stationary orbits a few tens of kilometers from the geostationary orbit 11. If the observation satellite 15 has been placed in one of these orbits, its speed of movement relative to the Earth 12 will be different from that of the geostationary satellites. To be more precise, if the observation satellite 15 is placed in the orbit 16, i.e. inside the geostationary orbit 11, it will have an orbital speed greater than that of the geostationary satellites $10_1$ through $10_n$. Its movement relative to the geostationary satellites $10_1$ through $10_n$ will therefore be as shown by the arrow 18. As a result it will sweep past the geostationary satellites $10_1$ through $10_n$ and be able to observe the respective satellites $10_n$ through $10_1$ in succession if their respective positions are as shown. On the other hand, if the observation satellite 15 is placed in the orbit 17, i.e. outside the geostationary orbit 11, it will have an orbital speed less than that of the geostationary satellites $10_1$ through $10_n$. Its movement relative to the geostationary satellites $10_1$ through $10_n$ will therefore be as shown by the arrow 19. As a result, it will sweep past the geostationary satellites $10_1$ through $10_n$ and able to observe the respective satellites $10_1$ through $10_n$ in succession if their respective positions are as shown.

In summary, the quasi-geostationary orbit 16 has a slow Eastward drift and the quasi-geostationary orbit 17 has a slow Westward drift. The rate of drift is proportional to the distance between the orbit 16 and 17 and the geostationary orbit 11. Thus, placing an observation satellite in quasi-geostationary orbit enables it to sweep past all of the geostationary orbits at a small distance and, therefore, to observe all the satellites in that orbit in succession.

Placing the observation satellite at a small distance from the geostationary orbit 11 (small altitude difference) makes it possible to achieve resolutions of one meter or better with existing imaging devices. The observation orbit is preferably at a nominal distance of approximately 100 km from the geostationary orbit.

The observation satellite or satellites of the system of the invention can be conventional satellites but they are preferably "minisatellites", i.e. their payload has a mass in the order of 50 kg, essentially for reasons of discretion. Minisatellites of this kind can be carried on conventional satellites and launched simultaneously with the latter, because of their low weight. In this case, small size observation means are used.

Figure 2:
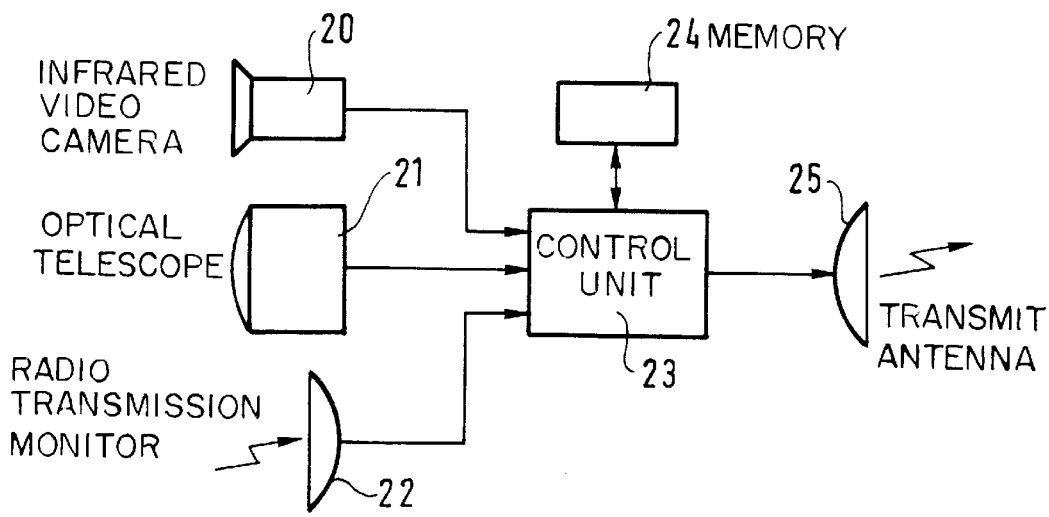
FIG. 2 is a block diagram of the observation means on board an observation satellite of the invention.

FIG. 2 is a block diagram of the observation means on board an observation satellite of the invention.

The observation means on board a satellite of the invention can comprise, for example, an infrared video camera 20, an optical telescope 21 and/or means 22 for monitoring radio transmissions from a geostationary satellite $10_1$ through $10_n$.

These various observation means are connected to control means 23 which formats the data for transmission via an antenna 25. The control means 23 are preferably connected to means 24 for storing data from the observation means. It is then possible to transmit the stored data at a propitious time, for example when the observation satellite is favorably located relative to a receiver able to process the data. The device receiving the data transmitted by the satellite is, for example, a ground station, an aircraft or a cooperating satellite, for example a geostationary satellite.

An observation satellite of the invention can be placed in a quasi-geostationary orbit either autonomously by its own propulsion system or by separating the observation satellite from a host satellite during the placing of the host satellite in geostationary orbit. In the latter case, the observation satellite is a temporary passenger on the host satellite.

Each observation satellite of the invention advantageously comprises a propulsion system enabling it to move relative to the nominal geostationary orbit 11. It is then possible for it to move closer to satellites in order to observe them more closely. One particularly beneficial possibility conferred by the presence of a propulsion system is that the satellite can then move to either side of the geostationary orbit, jumping between the orbits 16 and 17, in order to limit its observation to a sector of the geostationary orbit 11. These shifts are represented by the paths 26 in FIG. 1 and correspond to the sector 27. These orbital jumps can be either automated or commanded from a ground station.

The method of the invention of observation of geostationary satellites thus consists in a placing at least one observation satellite in an observation orbit near the geostationary satellites, observing the geostationary satellites and transmitting the information obtained from such observations to a receiver.

The invention also concerns another method of observation of geostationary satellites that does not use non-geostationary observation satellites in an orbit near the geostationary satellites but provides observation means on a host satellite designed to be placed in the geostationary orbit. During its placing in the geostationary orbit, the host satellite, which is the satellite labelled $10_n$ in FIG. 1 (for example), follows a curve such as the curve 28. During this phase the satellite $10_n$ gradually approaches the geostationary orbit 11, sweeping past their major part of this orbit. It follows that it is capable of observing the geostationary satellites throughout this phase, up to reaching its final orbital position. During this phase, the observation means that it carries can be used for the same purposes as already described. The range of longitudinal drift of the host satellite can be optimized in order to image a large part of the geostationary orbit, in other words, the approach to the geostationary orbit can be particularly slow compared to conventional geostationary satellites. When the host satellite is on station, the observation means are of no further utility and the information obtained by means of the observations can be transmitted to a receiver.

The imaging instrumentation is placed on the face of the host satellite that faces away from the Earth, for example, the host satellite being a cooperative commercial satellite, for example.

I claim:

1. System for observation of geostationary satellites ($10_1$–$10_n$) in a geostationary orbit (11), characterized in that it comprises at least one observation satellite (15) in an observation orbit (16, 17) near said geostationary orbit (11), said observation satellite (15) comprising means (20, 21, 22) for observation of said geostationary satellites ($10_1$–$10_n$) and means for transmitting information obtained from said observation means (20, 21, 22) to a receiver.

2. System as claimed in claim 1 characterized in that said observation satellite (15) includes a propulsion system enabling it to move relative to said geostationary orbit (11).

3. System as claimed in claim 1 characterized in that said observation means (20, 21, 22) include an optical telescope (21).

4. System as claimed in claim 1 characterized in that said observation means (20, 21, 22) include an infrared camera (20).

5. System as claimed in claim 1 characterized in that said observation means include means (22) for monitoring radio transmissions from said geostationary satellites.

6. System as claimed in claim 1 characterized in that said observation satellite (15) include means (24) for storing said information obtained from said observation means (20, 21, 22).

7. Method of observation of geostationary satellites ($10_1$–$10_n$) in a geostationary orbit (11),
characterized in that it comprises in providing observation means on a host satellite designed to be placed in said geostationary orbit (11) with said observation means, observing said geostationary satellites ($10_1$–$10_n$) during injection of said host satellite into said geostationary orbit (11) and before said host satellite is in said geostationary orbit and transmitting the information obtained from such observations to a receiver.

8. Method of observation of geostationary satellites ($10_1$–$10_n$) in a geostationary orbit (11),
characterized in that it comprises in placing at least one observation satellite (15) in an observation orbit (16, 17) near said geostationary orbit (11), observing said geostationary satellites ($10_1$–$10_n$) from said observation satellite and transmitting the information obtained from such observations to a receiver.

9. Method as claimed in claim 8 characterized in that said observation orbit (16, 17) is at a nominal distance of approximately 100 km from said geostationary orbit (11).

10. Method as claimed in claim 8 characterized in that it comprises in moving said observation satellite (15) to either side of said geostationary orbit (11) in order to limit observation to a sector (27) of the geostationary orbit (11).

* * * * *